(12) United States Patent
Ebertseder et al.

(10) Patent No.: US 10,948,032 B2
(45) Date of Patent: Mar. 16, 2021

(54) METHOD FOR OPERATING AN AUTOMATED DRIVE TRAIN OF A MOTOR VEHICLE AND AUTOMATED DRIVE TRAIN

(71) Applicant: ZF Friedrichshafen AG, Friedrichshafen (DE)

(72) Inventors: Thomas Ebertseder, Pocking (DE); Hans Pilzweger, Neuhaus am Inn (DE); Daniel Nachbaur, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/597,897

(22) Filed: Oct. 10, 2019

(65) Prior Publication Data

US 2020/0116216 A1 Apr. 16, 2020

(30) Foreign Application Priority Data

Oct. 10, 2018 (DE) .......................... 10 2018 217 269

(51) Int. Cl.
*F16D 48/06* (2006.01)
*B60W 30/18* (2012.01)

(52) U.S. Cl.
CPC .... *F16D 48/06* (2013.01); *F16D 2500/10412* (2013.01); *F16D 2500/30806* (2013.01);
(Continued)

(58) Field of Classification Search
CPC ........... F16D 48/06; F16D 2500/10412; F16D 2500/30806; F16D 2500/3102;
(Continued)

(56) References Cited

U.S. PATENT DOCUMENTS 5,700,227 A * 12/1997 Kosik ................... B60W 10/02
192/12 R
5,931,883 A * 8/1999 Ghil ........................ F16H 59/36
701/51
(Continued)

FOREIGN PATENT DOCUMENTS

DE 19733465 A1 * 2/1998 ...... B60W 30/18063
DE 199 10 573 A1 9/2000
(Continued)

OTHER PUBLICATIONS

German Search Report Corresponding to 10 2018 217 269.2 dated Mar. 4, 2019.

*Primary Examiner* — Tisha D Lewis
(74) *Attorney, Agent, or Firm* — Davis & Bujold PLLC; Michael J. Bujold

(57) ABSTRACT

A method for operating an automated drive train of a motor vehicle in which, upon actuation of a service brake up to a standstill of the vehicle, a drive connection between the drive machine and at least one drive axle of the vehicle is automatically disengaged by disengaging a clutch. During release of the service brake, the drive connection is automatically engaged by engaging the clutch. Based on a selected gear step, a desired drive direction of the vehicle is determined, and, during the release of the service brake, is compared with an actual drive direction. If the desired drive direction matches the actual drive direction, the pressure in the clutch is increased according to a first modulation characteristic curve. However, if the desired drive direction is different from the actual drive direction, the pressure in the clutch is increased according to a second modulation characteristic curve.

11 Claims, 2 Drawing Sheets

(52) U.S. Cl.
CPC ........... *F16D 2500/3102* (2013.01); *F16D 2500/316* (2013.01); *F16D 2500/3111* (2013.01); *F16D 2500/70217* (2013.01)

(58) Field of Classification Search
CPC ....... F16D 2500/3111; F16D 2500/316; F16D 2500/70217; B60W 10/02; B60W 30/18118; B60W 2540/12; B60W 2540/14
See application file for complete search history.

(56) References Cited

U.S. PATENT DOCUMENTS

| | | |
|---|---|---|
| 6,454,677 B2 | 9/2002 | Saito et al. |
| 8,123,659 B2 | 2/2012 | Leibbrandt et al. |

FOREIGN PATENT DOCUMENTS

| | | | |
|---|---|---|---|
| DE | 601 18 830 T2 | 9/2006 | |
| DE | 10 2007 055 085 A1 | 5/2009 | |
| EP | 1035344 A2 * | 9/2000 | ............ F16D 48/08 |
| FR | 2 982 004 A1 | 5/2013 | |

* cited by examiner

METHOD FOR OPERATING AN AUTOMATED DRIVE TRAIN OF A MOTOR VEHICLE AND AUTOMATED DRIVE TRAIN

This application claims priority from German patent application serial no. 10 2018 217 269.2 filed Oct. 10, 2018.

FIELD OF THE INVENTION

The invention concerns a method for operating an automated drive train of a motor vehicle, an automated drive train of a motor, as well as the respective computer program product, a data storage medium, and an agricultural or municipal utility vehicle.

BACKGROUND OF THE INVENTION

In motor vehicles with automated manual transmissions or automatic transmissions, a transfer of drive movement of a drive machine of the motor vehicle takes usually place at the drive axles of the motor vehicle, even if there is no activation of the drive pedal by the driver, which creates a forward movement even without an activation of the drive pedal. To create a standstill of a motor vehicle, the driver needs to actively operate the respective service brake.

It is known also for motor vehicles with an automatic shift transmission or automatic transmissions to disengage during braking of a motor vehicle up to the standstill a drive connection between the drive machine and/or the drive axles of the motor vehicle. The disengagement and engagement of the drive connection takes place depending on the actuation of the service brake. A sensor captures hereby the actuation or release, respectively, based on a distance adjustment of the actuation element of the service brake. The reaction of the sensor at the actuation of the operating brake happens already after a little distance adjustment of the activating element, to signal early enough a brake operation. The release of the service brake therefore does not immediately cause the engagement of the drive connection, so that a vehicle in a slope position can possibly start a forward or backward movement depending on the inclination and the hereby resulting slope gravity force.

Known through DE 601 18 830 T2 is a method in which a connection between the drive machine of a motor vehicle and a drive axle of the motor vehicle is disengaged within the framework of a function. The function is hereby activated when the motor vehicle is stationary and activation of the operating brake is recognized by a sensor. It is determined through an additional inclination sensor whether the motor vehicle is also in an inclined position. Hereby and depending on the incline and the selected drive direction, the function is activated or remains be activated. If incline is present and it exceeds a certain value, the function is not activated, meaning that the drive train of the motor vehicle is not put into a neutral state in which the drive machine and the drive axle are disengaged from each other, even though the motor vehicle is kept in a stationary condition through the activated service brake.

The applicant knows another method where, by means of a brake pressure sensor, initially the brake pressure in a motor vehicle brake system is calculated. Hereby, the brake pressure is created by the driver of the motor vehicle through a manual activation of a brake. Through the captured brake pressure, a road slope is calculated in which the motor vehicle is present. When starting the motor vehicle, a clutch of the drive train is then activated by a clutch pressure which is large enough to prevent a downhill rolling on the slope after releasing the brake.

SUMMARY OF THE INVENTION

Based on the previously described state of the technology, it is now the objective of the present invention to propose an improved method for the operation of an automated drive-train of a motor vehicle.

This object is solved, in accordance with the invention, through the method of operating an automated drive train of a motor vehicle in accordance with the independent claim(s). Advantageous embodiments and further designs of the invention are a result of the dependent claims.

The invention concerns a method of operating an automated drive train of a motor vehicle, whereby the activation of a service brake, up the stand-still of a motor vehicle, disengages a drive connection between a drive machine and at least one drive axle of the motor vehicle by means of the disengagement of a clutch and, during the release of the service brake, the drive connection is again automatically engaged by means of the engagement of the clutch. The inventive method is characterized through the fact that, based on a selected gear-step, a nominal drive direction of the motor vehicle is determined, whereby the nominal drive direction during the release of the service brake is subject to a comparison with the actual drive direction, whereby in an acknowledged match of the nominal drive direction with the actual drive direction, a first modulation characteristic curve is used for the increase of the pressure in the clutch, and during an acknowledged deviation of the nominal drive direction from the actual drive direction, a second modulation characteristic curve is used for the increase of the pressure in the clutch.

The invention has, compared to the state of the technology, at first the advantage that without additional sensors in particular without the necessity of an inclination sensor or a brake pressure sensor, the movement of the motor vehicle in an unwanted direction, for instance due to the slope force of gravity, is recognized. While initially the nominal drive direction is determined based on the selected gear step by the motor vehicle driver, it is a simple way to determine without additional costs which drive direction, forward or backward, is desired by the motor vehicle driver. Hereby, the differentiation whether a forward gear or reverse gear is selected is already sufficient in accordance with the invention. The determination of an exact gear step is furthermore not required, but can also be provided. In addition, the actual drive direction of the motor vehicle can be determined in a simple way by means of the wheel rotational speed sensors which are already present. Through the comparison of the determined nominal drive direction with the actual drive direction it can be reliably calculated if a rolling of the motor vehicle takes place in a direction which is not wanted by the vehicle driver. The invention establishes an additional advantage that a case differentiation is processed which, based on each result of the comparison, meaning match or deviation, either the first or the second modulation characteristic curve is used to increase the pressure in the clutch. The invention allows therefore the recognition of non-wanted roll movement by the driver of the vehicle and then a matching reaction of the motor vehicle through the use of the respective modulation characteristic curve.

The inventive method is particularly suitable for so-called "stop and go" maneuvers on slopes, in which there is always the danger of an unwanted down-rolling. The method can hereby advantageously be initiated independently by activation of the service brake by the vehicle operator, for instance by means of a brake pedal.

The inventive method is hereby executed preferably for the purpose by a control unit, which has an electronic calculation unit, an electronic storage, and data inputs and data outputs.

An automated drive train is meant to be a drive train for a motor vehicle where at least one clutch activation automatically takes place through a control unit. In particular, the clutch is automatically engaged and the start and is automatically disengaged again at the stop. Furthermore and in addition for a speed request by the vehicle driver, also a gear selection can take place automatically through the control unit. Also, the motor vehicle operator can carry out the gear selection and the automatic drive train shifts by means of the automatic activation of the clutch into the selected gear step. If the drive train has more than just one clutch, several clutches and in particular all clutches can automatically be activated by the control unit.

In accordance with a preferred embodiment of the invention it is provided that the second modulation characteristic curve presents a faster pressure increase than the first modulation characteristic curve. The first and the second modulation characteristic curves each describe the nominal pressure in the clutch over the time, meaning the pressure in the clutch which leads to the engagement of the clutch and therefore to the engagement of the drive connection, is increased in accordance with the first or second, respectively, modulation characteristic curve. Both modulation characteristic curves described each an increased pressure over the time. That nominal pressure is applied by a suitable activation device, for instance a pump, in the clutch. While the second modulation characteristic curve describes a faster pressure increase than the first modulation characteristic curve, the use of the second modulation characteristic curve instead of the first modulation characteristic curve allows faster transfer of a respective larger torque to the at least one drive axle. Thus, unwanted downhill rolling, in particular during a heavy load condition of the motor vehicle, or with a trailer operation of the motor vehicle, can be advantageously avoided.

Preferably, the second modulation characteristic curve is in particular designed to increase the pressure in such a way in the clutch regarding the time interval and the pressure value, that unwanted rolling on a slope can be reliably avoided even at maximal payload and maximum trailer load of the motor vehicle. The hereby necessary pressure increase over time can, for instance, be calculated and then stored in a second modulation characteristic curve.

Since the use of the second modulation characteristic curve in a plane, due to the fast increasing pressure in the clutch can lead to a comparable uncomfortable start of the motor vehicle, the first modulation characteristic curve is used in a plane. On the other hand, the use of the first modulation characteristic curve on a slope, in particular in a heavy loaded condition of the motor vehicle, or trailer operation of the motor vehicle, respectively, would lead to an unwanted downhill rolling. The recognition whether a motor vehicle is situated in a plane or on a slope is hereby executed through the already described comparison.

In accordance with an additional, preferred embodiment of the invention is it provided that the activation and the release of the service brake are captured through a brake light sensor. The brake light sensor is already present in each motor vehicle and can therefore, without any additional cost or assembly space, the use to determine whether the service brake is in an engaged or disengaged position. Usually, the brake light sensor reacts to an activation of the service brake by activating the brake lighting of the motor vehicle to alert the following traffic to the braking. Advantageously, the signal, which is produced by the brake lights sensor for the brake light activation, is tapped to engage in addition the clutch or the drive connection, respectively, whereby the pressure in the clutch increases, in accordance with the first modulation characteristic curve or, in accordance with the second modulation characteristic curve.

In accordance with another, preferred embodiment of the invention it is provided that the comparison happens within a time window of 100 ms, after the release of the service brake. This results in the advantage that the comparison has already happened or is completed, respectively, and that possibly the second modulation characteristic curve can be used before the motor vehicle can establish a considerable speed in an unwanted direction, due to the slope gravity force. The motor vehicle is rather in an acceleration condition out from the standstill, in which it only shows a very low speed. Simultaneously, the time window of 100 ms is however long enough to capture generally through the wheel rotational speed sensors the actual drive direction.

In accordance with an additional, preferred embodiment of the invention it is provided that, with a recognized deviation of the nominal drive direction from the actual drive direction, the first modulation characteristic is then also used when the detected speed of the motor vehicle does not reach a threshold. It allows advantageously that during a low-loaded motor vehicle, like after the immediate release of the operating brake, downhill rolling takes place to some extent, before the increase of the pressure in the clutch also guarantees in accordance with the first modulation characteristic curve a sufficient torque transfer to move the motor vehicle into the desired drive direction. By comparing now the detected motor vehicle speed with the threshold value for the motor vehicle speed it is possible—if the threshold value is not reached and the detected motor vehicle speed is therefore below the threshold of the determined speed—the use of the second modulation characteristic curve can be avoided to prevent in this case an uncomfortable starting. The reaching of the threshold value for the speed at a determined deviation presents therefore an additional criterion which has to be met to use the second modulation characteristic curve.

A threshold value is preferably a fixed predetermined threshold value, which was once determined based on the vehicle and then permanently stored in the electronic storage of the control unit.

The threshold value furthermore preferably relates only to the detected speed which does not point in the desired direction of travel. If however the captured speed points in the desired direction, it is not tested against the threshold value.

In accordance with an additional, preferred embodiment of the invention it is provided that after the expiration of a predetermined time interval after the second modulation characteristic curve was used, another comparison takes place and, if a match is recognized, then the first modulation characteristic curve is again used. The advantage hereby is that the pressure increase at a certain modulation point of the pressure in the clutch, when it was recognized that the motor vehicle does not move anymore in an unwanted direction, that the continued increase of the pressure takes place in accordance with the first modulation characteristic curve, and therefore comfortably. Thus, the starting procedure is comparatively comfortably once it is recognized that the motor vehicle no longer moves against the desired direction of travel and there is no danger anymore that a reverse rolling of the motor vehicle exists.

A predetermined time interval is preferably 0.5 to 1.0 seconds.

In addition, the invention concerns an automatic drive train for a motor vehicle, comprising an service brake, a drive machine, at least one drive axle, a clutch, and a control unit, whereby the control unit is designed, during the activation of the operating brake up to the stand-still of the motor vehicle, to disengage automatically a drive connection between the drive machine and the at least one drive axle of the motor vehicle, by means of disengaging the clutch and during a release of the service brake to again automatically engage the drive connection through the engagement of the clutch. The inventive drive train is characterized in that the control unit is further designed to, based on the selected gear step, determine a desired drive direction of the motor vehicle, the desired drive direction is compared with the actual drive direction during the release of the service brake, to use a first modulation characteristic curve and in the case of a match of the actual drive direction with the first modulation characteristic curve to increase the pressure in the clutch, and during a recognized deviation of the desired drive direction from the actual drive direction to use a second modulation characteristic curve for the increase of the pressure in the clutch.

The drive train according to the invention thus comprises all means necessary for carrying out the method according to the invention and is designed to carry out the method according to the invention. This results in the advantages already described in connection with the method according to the invention also for the drive train according to the invention.

The control unit is preferably an electronic control unit which has an electronic calculating unit, and an electronic memory, and data inputs and data outputs.

The electronic calculating unit is designed as microprocessor with a connected main memory.

The data inputs and the data outputs are preferably designed to capture signals of the wheel rotational speed sensors and the brake light sensors, as well as signals for the activation of actuators, where the actuators are designed for their part to increase or decrease the pressure in the clutch.

In accordance with an additional preferred embodiment of the invention is it provided that the drive train is hereby designed to execute the inventive method.

The invention concerns also a computer program product for an inventive drive train through which the inventive method can be executed. The computer program product guides hereby the drive train, in particular the control unit of the drive train, to execute the inventive method.

The invention concerns in addition also a data media which carries the inventive computer program product.

The invention concerns finally an agricultural or community commercial vehicle which comprises the invented drive train.

BRIEF DESCRIPTION OF THE DRAWINGS

In the following, the invention is further explained based on the presented drawings.

These show.

DETAILED DESCRIPTION OF THE PREFERRED EMBODIMENTS

Figure 1:
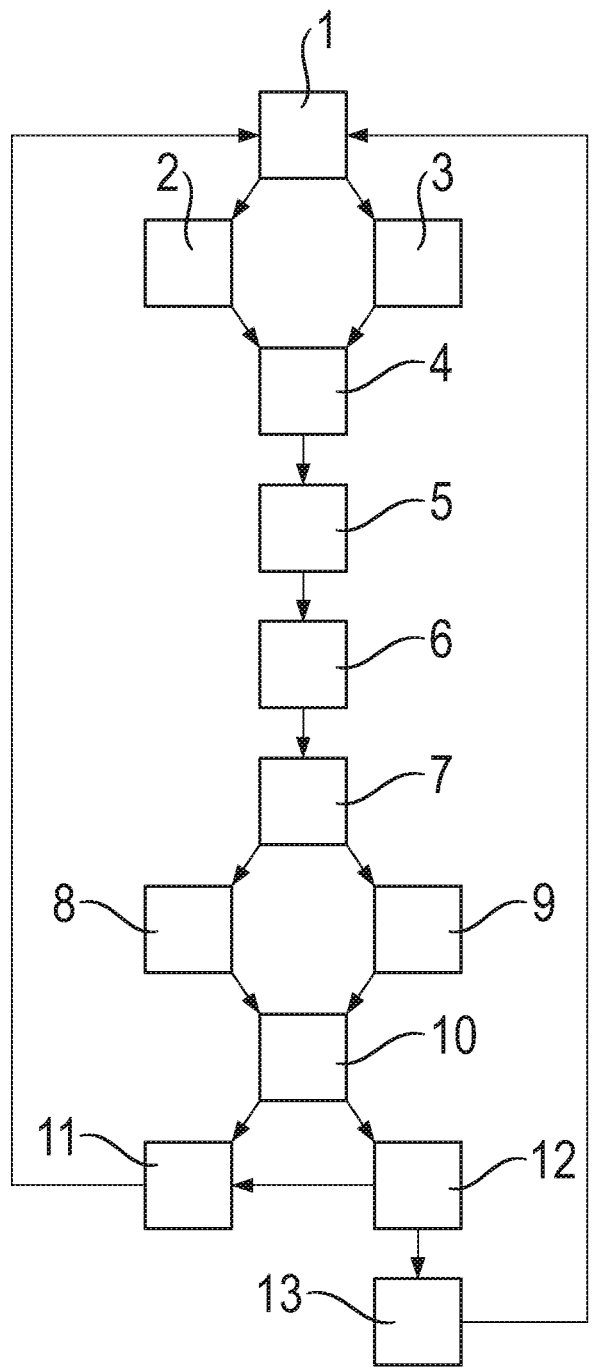
FIG. 1 exemplary and schematically a possible embodiment of a method according to the invention for operating an automated drive train of a motor vehicle in the form of a flow chart and FIG. 2 exemplary and schematically a possible embodiment of an automated drive train for a motor vehicle.

Same parts, functional units, and comparable components are all marked by the same reference characters. The parts, functional units, and comparable components are identically mentioned regarding their technical characteristics, unless the description describes explicitly or implicitly anything different.

FIG. 1 shows exemplary and schematically a possible embodiment of an invented method for operating an automated drive train 20 of a motor vehicle 31 in form of a flow chart. In the method step 1, a service brake 21 is activated by a motor vehicle driver of the motor vehicle 31, where the motor vehicle driver adjusts the position of a brake pedal 29 by a certain adjustment. This activation is detected in step 2 by a control unit 25, which reads the signal of a brake light sensor 28 upon the activation of the brake lights of the motor vehicle 31. Simultaneously in step 3, a speed of a motor vehicle 31 is determined by the control unit 25 based on signals from the wheel rotational speed sensors 27', 27", 27''', 27''''. The brake activation leads in step 4, for example, to the standstill of a motor vehicle 31 which is detected by the control unit 25 based on the signals from the wheel rotational speed sensors 27', 27", 27''', 27''''. In step 5, immediately after detection of the standstill, the control unit 25 triggers automatic disengagement of a drive connection 26 between a drive machine 22 and at least one drive axle 23, 23' of the motor vehicle 31 by disengaging clutch 24. In the now following method step 6, the motor vehicle driver wants to start again and finishes the activation of the service brake 21, which is recognized by the control unit 25 based on the respective signal of the brake light sensor 28. At this time and instructed by the control unit 25, the drive connection 26 is automatically again engaged by means of engaging the clutch 24. The control unit 24 reads thereafter in step 7 through the transmission control unit 30 the actual gear position. Hereby, it is differentiated between an arbitrary shifted forward gear position and an arbitrary reverse gear position. In step 8, the control unit 25 determines based on the selected gear step, as an example of a forward gear, the desired drive direction of the motor vehicle 31. Since a forward gear is recognized as a selected gear step, the desired drive direction is accordingly determined as forward. In parallel to the method step 8, detecting of the actual drive direction takes place in step 9 based on the signals by the wheel rotation speed sensors 27', 27", 27''', 27''''. In the following method step 10, the desired drive direction is subject to a comparison with the actual drive direction. This comparison takes place, for example, within a time window of 100 ms after the release of the service brake 21. If a match of the nominal drive direction with the actual drive direction is recognized, step 11 uses for the drive direction a first modulation characteristic curve for the increase of the pressure in clutch 24. The first modulation characteristic curve describes the increase of the pressure over time, which is matched mainly with an empty motor vehicle 31, which shall possibly start driving on a plane comfortably, meaning consistently. As soon as the operator of the vehicle activates again the service brake 21, the method will start again at step 1. If, however, a deviation of the desired direction of travel from the actual direction of travel is seen in step 10 it is checked in step 12, whether the speed of the motor vehicle 31 detected via the wheel rotational speed sensors 27', 27", 27''', 27'''' reaches a threshold speed. If the captured speed does not reach the threshold, the method is continued in step 11 and the first modulation characteristic curve is used. If, however, the detected speed reaches the threshold or even exceeds it, a second modulation characteristic curve is used in step 13 for the increase of the pressure in the clutch 24. The second modulation characteristic curve describes the increase of the pressure over time, which is mainly matched for a fully loaded motor vehicle 31, which is expected to start safely on a slope. Hereby, the second modulation characteristic curve describes a clear, faster pressure increase than the first modulation characteristic curve. As soon as the vehicle driver activates again the operating brake 21, the method starts again at step 1.

Figure 2:
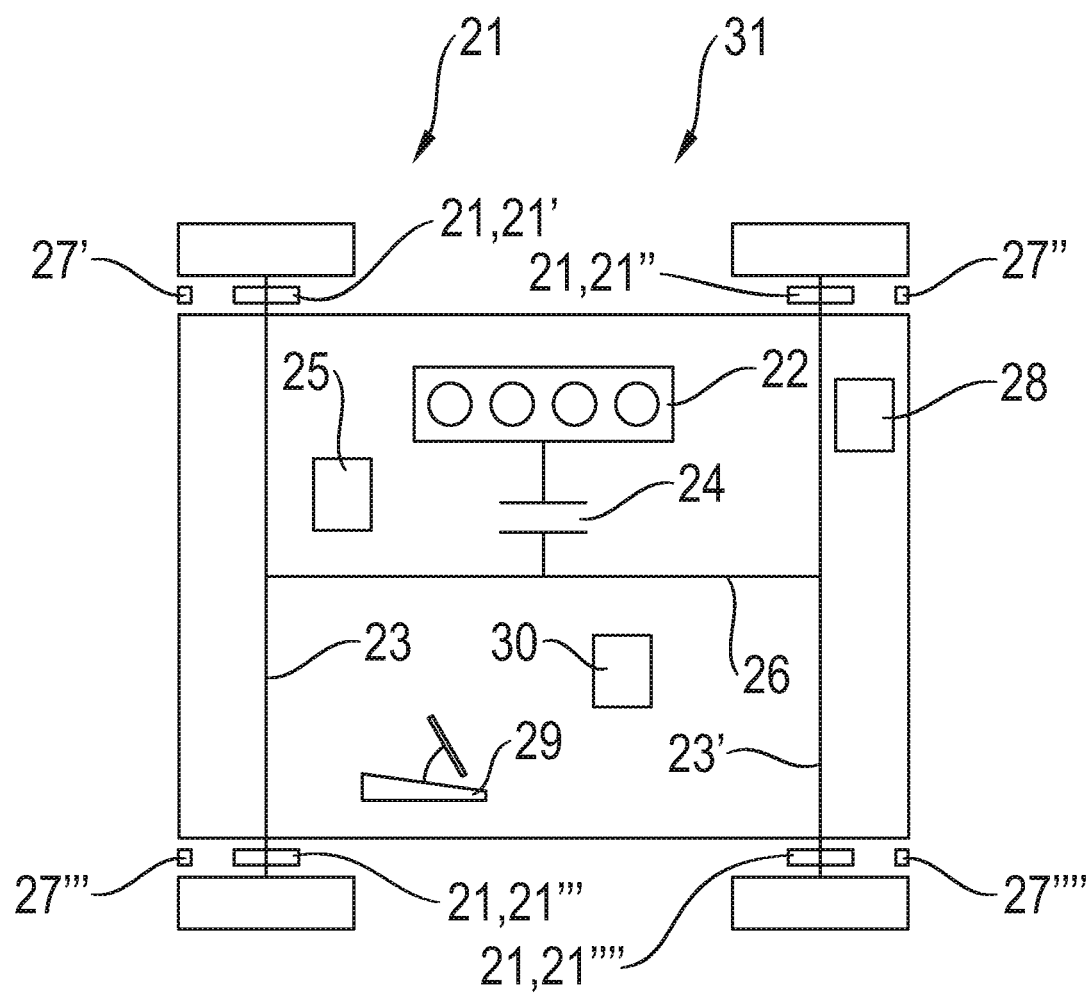

FIG. 2 shows exemplarily and schematically a possible embodiment of an automated drive train 20 for a motor vehicle 31. The drive train 20 comprises a service brake 21 which is designed as a mechanical friction brake 21, which in turn comprises four individual brakes 21', 21'', 21''', 21''''. In addition, the drive train 20 comprises a drive machine 22 which is designed, for example, as a diesel motor, two drive axles 23 and 23', a clutch 24 which is designed as a multi-plate clutch 24, and a control unit 25. Through disengagement or engagement, respectively, of the clutch 24 the drive connection 26 between the drive machine 22 and the two drive axles 23 and 23' of the motor vehicle 31 can either be disengaged or engaged, respectively. The control unit 25, for example, is designed as an electronic control unit 25 which has an electronic calculating unit, an electronic memory, and data inputs and data outputs. Through the not shown data inputs in FIG. 2, the control unit 25 captures signals of the wheel rotational speed sensors 27', 27'', 27''', 27'''' as well as signals of a brake light sensor 28. Through the data outputs in FIG. 2, also not shown, the control unit 25 provides signals for the activation of actuators, whereby the actuators are hereby designed to increase or decrease the pressure in the clutch 24 and it can hereby disengage or engage the clutch 24. The control unit 25 is designed such that, upon activation of the service brake 21 by the driver up to a standstill of the motor vehicle 31, for example by means of a brake pedal 29, the drive connection 26 between the drive machine 22 and the two drive axles 23, 23' of the motor vehicle 31 is automatically disconnected by disengagement of the clutch 24. Activation of the service brake 21 is recognized by the control unit 25 through the received signal from the brake light sensor 28. The control unit 25 recognizes the standstill of the motor vehicle 31 again based on the wheel rotational speed sensors 27', 27'', 27''', 27''''. During the release of the service brake 21 by the vehicle driver, the control unit 25 receives a signal of the brake light sensor 28 which indicates the release of the service brake 21. The control unit 25 is designed to automatically engage the drive connection 26 by engaging the clutch 24 when the signal is received. Furthermore, the control unit 25 is configured to determine a desired direction of travel of the motor vehicle 31 on the basis of a selected gear ratio. A signal which contains the selected gear step is received by the control unit 25 through a transmission control unit 30. Finally, the control unit 25 is also designed to provide a comparison of the desired drive direction with the actual drive direction when the service brake 21 is released. The wheel rotational speed sensors 27', 27'', 27''', 27'''' provide a signal for the control unit 25 which contains the actual drive direction. If the control unit 25 detects that the desired drive direction matches the actual drive direction, it uses a first modulation characteristic curve for the increase of the pressure and the clutch 24. However, if the control unit 25 detects that the desired drive direction is different than the actual drive direction, it uses a second modulation characteristic curve for the increase of the pressure in the clutch 24.

REFERENCE CHARACTERS

1 Activation of the Service brake
2 Detecting the activation of the Service brake
3 Determination of the Speed of the Motor Vehicle
4 Stand-still of the Motor Vehicle
5 Separation of the drive connection between a drive machine and at least a drive axle
6 Engaging of the drive connection
7 Reading of the selected gear step
8 Determination of the desired drive direction
9 Detecting the actual drive direction
10 Comparison of the desired drive direction with the actual drive direction
11 Using the first modulation characteristic curve if the desired drive direction and the actual drive direction match
12 Using the first modulation characteristic curve if the desired drive direction is different than the actual drive direction and the determined speed of the motor vehicle does not reach the threshold value
13 Using the second modulation characteristic curve when there is a difference between the desired drive direction and the actual drive direction and the determined speed of the motor vehicle reaches or exceeds the threshold value
20 Drive Train
21 Service brake
21', 21'', 21''', 21'''' Single Brake
22 Drive Motor, Diesel Motor
23, 23' Drive Axle
24 Clutch, Multi-Plate Clutch
25 Control Unit
26 Drive Connection
27', 27'', 27''', 27'''' Wheel Rotational Speed Sensors
28 Brake Light Sensor
29 Brake Pedal
30 Transmission Control Unit
31 Motor Vehicle

The invention claimed is:

1. A method of operating an automated drive train of a motor vehicle, the method comprising:
   upon activation of a service brake up to a standstill of the motor vehicle, disengaging a clutch to automatically disengage a drive connection between a drive machine and at least one drive axle of the motor vehicle, and upon release of the service brake, engaging the clutch to automatically engage the drive connection,
   determining a desired drive direction of the motor vehicle based on a selected gear step,
   comparing, during the release of the service brake, the desired drive direction with an actual drive direction,
   if the desired drive direction matches the actual drive direction, increasing a pressure of the clutch according to a first modulation characteristic curve, and
   if the desired drive direction is different than the actual drive direction, increasing the pressure of the clutch according to a second modulation characteristic curve.

2. The method according to claim 1, wherein the increase of the pressure of the clutch according to the second modulation characteristic curve is faster than the increase of the pressure of the clutch according to the first modulation characteristic curve.

3. The method according to claim 1, further comprising detecting, via a brake light sensor, the activation and the release of the service brake.

4. The method according to claim 1, further comprising comparing the desired drive direction with the actual drive direction within a time window of 100 ms after the release of the service brake.

5. The method according to claim 1, further comprising increasing the pressure of the clutch according to the first modulation characteristic curve, if the desired drive direction is different than the actual drive direction and, at a same time, a detected speed of the motor vehicle is below a threshold value.

6. The method according to claim 1, further comprising, following expiration of a predetermined time interval after the pressure of the clutch was increased according to the second modulation characteristic curve, additionally comparing a further desired drive direction with a further actual drive direction, and, if the further desired drive direction matches the further actual drive direction, increasing the pressure of the clutch according to the first modulation characteristic curve.

7. An automated drive train for a motor vehicle, the automated drive train comprising:
a service brake,
a drive machine,
at least one drive axle,
a clutch,
a control unit,
the control unit being designed, during actuation of the service brake to achieve standstill of the motor vehicle, to automatically disengage a drive connection, between the drive machine and the at least a drive axle of the motor vehicle, by disengaging the clutch, and, during release of the service brake, to automatically engage again the drive connection by engaging the clutch, and
the control unit being also designed to determine a desired drive direction of the motor vehicle based on a selected gear step, to compare the desired drive direction with an actual drive direction during the release of the service brake, to increase a pressure at the clutch, according to a first modulation characteristic curve, when the desired drive direction matches the actual drive direction, and to increase the pressure at the clutch, according to a second modulation characteristic curve, when the desired drive direction is different than the actual drive direction.

8. The drive train according to claim 7, wherein the drive train is designed to execute a method comprising the steps of upon activation of the service brake up to the standstill of the motor vehicle, automatically disengaging the drive connection between the drive machine and the at least one drive axle of the motor vehicle by disengaging the clutch, and upon the release of the service brake, automatically engaging the drive connection by engaging the clutch; determining the desired drive direction of the motor vehicle based on a selected gear step; comparing the desired drive direction with the actual drive direction, during the release of the service brake; and if the desired drive direction matches the actual drive direction, increasing the pressure of the clutch according to the first modulation characteristic curve; and if the desired drive direction is different than the actual drive direction, increasing the pressure of the clutch according to the second modulation characteristic curve.

9. The drive train according to claim 7 in combination with a computer program product which executes a method comprising the steps of, upon activation of the service brake up to the standstill of the motor vehicle, automatically disengaging the drive connection between the drive machine and the at least one drive axle of the motor vehicle by disengaging the clutch, and, upon the release of the service brake, automatically engaging the drive connection by engaging the clutch; determining the desired drive direction of the motor vehicle based on a selected gear step; comparing the desired drive direction with the actual drive direction, during the release of the service brake; and if the desired drive direction matches the actual drive direction, increasing the pressure of the clutch according to the first modulation characteristic curve; and if the desired drive direction is different than the actual drive direction, increasing the pressure of the clutch according to the second modulation characteristic curve.

10. The drive train according to claim 9 in combination with a data medium comprising the computer program product.

11. An agriculture or municipal utility vehicle comprising:
a drive train having a service brake,
a drive machine,
at least one drive axle,
a clutch,
a control unit,
the control unit being designed, during actuation of the service brake to achieve standstill of the motor vehicle, to automatically disengage a drive connection between the drive machine and the at least a drive axle of the motor vehicle by disengaging the clutch, and, during a release of the service brake, to automatically engage again the drive connection by engaging the clutch,
the control unit also being designed to determine a desired drive direction of the motor vehicle based on a selected gear step, to compare the desired drive direction with an actual drive direction during the release of the service brake, to increase a pressure at the clutch according to a first modulation characteristic curve when the desired drive direction matches the actual drive direction, and to increase the pressure at the clutch according to a second modulation characteristic curve when the desired drive direction is different than the actual drive direction.

* * * * *